United States Patent [19]

Covington

[11] 4,131,696

[45] Dec. 26, 1978

[54] CONTACT LENS TREATMENT

[75] Inventor: William Covington, West Cornwall, Conn.

[73] Assignee: Burton, Parsons and Company, Inc., Washington, D.C.

[21] Appl. No.: 843,554

[22] Filed: Oct. 19, 1977

[51] Int. Cl.$^2$ ........................... G02C 7/04; G02B 1/10
[52] U.S. Cl. ..................................... 427/164; 351/40; 351/160 H
[58] Field of Search .................. 427/164; 351/160, 40

[56] References Cited

U.S. PATENT DOCUMENTS

| 3,549,747 | 12/1970 | Krezanoski et al. | 351/40 X |
| 3,657,003 | 4/1972 | Kenney | 427/430 R |

Primary Examiner—James R. Hoffman
Attorney, Agent, or Firm—Fidelman, Wolffe & Waldron

[57] ABSTRACT

Hard type contact lenses, such as those made of poly methyl methacrylate, are treated with an aqueous colloidal suspension of a physiologically inert inorganic hydrous oxide to render the lens surfaces wettable by lacrimal fluids thus decreasing eye irritation and increasing wearing comfort.

9 Claims, No Drawings

CONTACT LENS TREATMENT

BACKGROUND OF THE INVENTION

This invention relates to a method for treating contact lenses and more particularly to a method for modifying the surface of hard contact lenses so as to render the lenses more compatible with eye fluids.

The contact lenses to which use of this invention is directed are those known as hard lenses which are usually manufactured of transparent methyl methacrylate polymer. Such lenses as presently used are generally of the non-scleral or corneal type which fit directly on the cornea of the eye. One side of the lens is in full contact with the eye fluids while the other, or outer, side is in intermittant contact with the eye lid during eye closure as in blinking.

While the methyl methacrylate polymer lenses solved a number of problems inherent in older style lenses, being unbreakable and comparatively easy to insert, new problems were introduced because of the inherent nature of methyl methacrylate polymers. Manufacture of methyl methacrylate contact lenses is generally accomplished by a first rough grinding with steel and a final grinding with abrasive powders. The resulting lens surfaces display hydrophobic properties which are considered to be caused both by the general properties of the plastic and by the surface changes induced through grinding. Consequently, the lens surfaces are poorly wet by the eye fluids and the outer surface of the lens has a tendency to dry between applications of lacrimal fluid by the eye lids during blinking. This drying phenomenon often causes irritation and discomfort to the wearer and can even cause interference with vision.

There have been a number of ophthalmic solutions developed to act as wetting, cushioning or lubricating agents for contact lenses. These solutions are formulated to be compatible with the natural eye fluids and to enhance the wetting properties of eye fluids toward plastic contact lenses. Generally such ophthalmic solutions are isotonic, buffered to an appropriate pH, sterile and contain additives such as wetting agents, viscosity modifiers and medicaments. The solutions tend to function as artificial tears and provide wetting and lubricating effects toward contact lenses superior to the natural eye fluids. One example of such ophthalmic solutions is disclosed in U.S. Pat. No. 3,856,919.

Use of wetting and cushioning solutions provides a high degree of comfort to most wearers of contact lenses. Some individuals, however, suffer from overawareness of the lens presence. This problem is generally most acute upon initial wearing and the awareness typically subsides with time. In others, the problem does not subside and results in chronic overawareness which may even lead to an inability to continue wearing contact lenses. Consequently, there has been a persistent need for methods to give a contact lens wearer more comfort particularly during the initial wearing period.

It has been recognized in printed circuit manufacture, in the preparation of synthetic fibers for dyeing, in the production of photographic films and like uses, that an aqueous suspension of hydrous oxides will enhance the wettability of solid surfaces. Such techniques are disclosed in U.S. Pat. No. 3,657,003. It is also known that surface treatment of solids with inorganic colloid increases the strength of an adhesive band. This is disclosed in U.S. Pat. No. 3,861,978. Additionally, U.S. Pat. No. 3,854,952 discloses a silver halide carried on colloidal particles of an inorganic hydrous oxide to form photosensitive films or sheets.

SUMMARY OF THE INVENTION

The critical surface tension of hard type plastic contact lenses is increased by treating the lenses with an aqueous colloidal suspension of an inorganic hydrous oxide thereby rendering the lens surfaces readily wettable by lacrimal fluids. Treatment may be accomplished by immersing the lenses in the suspension for a time sufficient to allow colloidal hydrous oxide particles to physically bond to the lens surfaces. The hydrous oxide modifies the wettability characteristics of the lens surfaces and allows lacrimal fluids to spread over and wet the lenses. As a result, eye irritation is decreased and wearer comfort is enhanced.

Thus, it is an object of this invention to provide an enhanced degree of comfort to contact lens wearers.

It is another object of this invention to render hard contact lenses more readily wettable by lacrimal fluids thereby decreasing eye irritation.

Another object of this invention is to modify the surface properties of hard plastic contact lenses by depositing thereon a surface coating of colloidal inorganic hydrous oxide particles.

DETAILED DESCRIPTION OF THE INVENTION

Contact lenses of the hard type are surface-treated to provide greater wearer comfort by immersing the lenses in an aqueous colloidal suspension of a physiologically inert inorganic hydrous oxide for a period of time sufficient to cause a modification of the surface properties of the lenses. Thereafter, the lenses are rinsed with water, a sterile saline solution or similar liquid and emplaced in the eye of the wearer. The treatment renders the lens surfaces more readily wet by the eye fluids, tends to prevent the outer lens surface from drying between applications of lacrimal fluid during blinking, decreases irritation of the eye and enhances wearer comfort.

Treatment of the lens surfaces with a colloidal hydrous metal oxide results in an adhesion of colloidal particle to the surfaces which in turn increases the wettability of the lens by lacrimal fluids. The adhesion of the colloidal particles to the lens surfaces is believed to be a physical rather than a chemical phenomenon. Nevertheless, the physical bonding which occurs is quite strong. One application of the colloidal suspension to a methyl methacrylate lens will give increased wettability and enhanced wearer comfort for a period of a few weeks to a number of months.

Contact lenses made from poly methyl methacrylate (PMMA) are often described as hydrophobic. Because of the varying definitions applied to that word, it is more practical to discuss the effect of colloidal hydrous metal oxides or lens surfaces in terms of the critical surface tension of the plastic. It is now accepted that low energy solid surfaces such as PMMA have a critical surface tension. A liquid that has a surface tension lower than the critical surface tension of the solid tends to spread over and wet the surface of the solid. Conversely, a higher surface tension liquid tends to bead up on the solid surface.

The degree of wetting can be measured by the contact angle made by a drop of liquid on a solid surface. When the contact angle is small, the drop is flat and covers a relatively large area of the solid thus showing a high degree of wetting. For example, distilled water forms a contact angle of approximately 65° on the surface of PMMA thus indicating a relatively low degree of wetting. Tears, or lacrimal fluid, displays a surface tension about two-thirds that of water or about 46 dynes/cm. This compares to the critical surface tension of PMMA of about 39 dynes/cm. Thus, tear liquid displays a greater degree of wetting than does distilled water but still does not adequately wet contact lenses made of PMMA.

It has been found that treatment of hard contact lenses, such as those made of PMMA, with particular inorganic hydrous oxides increases the critical surface tension of the lens surfaces sufficiently to allow wetting by lacrimal fluids. As a result, the lenses do not dry during wearing, enhance wearer comfort particularly during the initial wearing period and allow persons suffering from chronic overawareness to successfully wear contact lenses.

Only a selected few of those elements which form hydrous oxides can be used in this procedure. First of all, the hydrous oxide used must be physiologically inert in the eye environment and must be compatible with and non-reactive toward all of the ophthalmic solutions used in conjunction with contact lenses. It is also preferred that the hydrous oxide be white or colorless rather than strongly colored as are some of the hydrous oxides.

The hydrous oxides of silicon, tin, aluminum and magnesium are preferred. Other hydrous oxides may be used but are less preferred. For example, hydrous oxides or iron may find use in selected cases but have disadvantages. These hydrous oxides are typically of a tan to red-brown color making them less desirable. But more importantly, iron and many other metals form strong complexes with EDTA which is a component of many ophthalmic solutions.

The hydrous oxide treating composition may be prepared in known fashion by the controlled hydrolysis of appropriate salt solutions. A salt of the selected element may be dissolved in water and the pH adjusted by addition of acid or base to cause a controlled hydrolysis of the salt and form a colloidal suspension of the hydrous oxide. In many cases, moderate heating and agitation aids in the hydrolysis reaction.

As used in this disclosure the term "hydrous oxide" specifically includes the true hydrous oxides, as well as hydroxides, hydrous hydrates and hydrous hydroxides. Strictly speaking, hydrous oxides are those materials which precipitate as an oxide and trap water in the process. However, all of those colloidal precipitates which carry indeterminate amounts of water are included within the hydrous oxide suspensions useful in the practice of this invention.

Practice of the invention necessitates the obtaining or preparation of a colloidal suspension of an appropriate hydrous metal oxide. Preparation of the suspension may conveniently be accomplished by the procedures described in U.S. Pat. No. 3,657,003. However, it is preferred that the chloride salts of the selected elements be used together with sodium hydroxide as the pH adjusting agent. This combination of reactants produces sodium chloride as a reaction byproduct and thus avoids the possible introduction of deleterious ions or compounds into the eye.

Particle size of the suspension is not critical so long as it is in the colloidal range. Generally, colloidal particles are considered to lie in the size range of about 10 to 10,000 Angstroms. The most useful size is generally in the lower part of that range as the smaller particles tend to form more stable suspensions. Suspension stability is of importance as that determines the useful shelf life of the treating composition. Stability and shelf life of the prepared suspensions can be increased by use of a stabilizing agent such as vegetable gums and high molecular weight polysaccarides.

Contact lenses are treated by contacting them with the colloidal hydrous oxide suspension for a time sufficient to allow adherence of particles over the lens surfaces. Contacting is most conveniently accomplished by immersing the lenses in the suspension for a short period of time; on the order of a few minutes. Thereafter, the lenses are removed from the suspension and rinsed thoroughly with water or saline solution. Rinsing will remove any excess and non-adhering particles. Thereafter, the lenses may be inserted in the eye with or without use of conventional wetting or cushioning solutions.

The increase in the critical surface tension of the lens surfaces is relatively long lasting although not permanent. Lenses so treated remain wettable by lacrimal fluids for a period of weeks to months after treatment. A normal care regimen may be followed after lens treatment. A typical care regimen comprises cleaning the lenses each night immediately after lens removal, rinsing thoroughly and storing in a combination soaking and wetting solution. Prior to reinsertion the lens is either rinsed slightly and inserted or inserted directly from the solution.

The procedure of this invention finds most use during the initial fitting and adaptation period of a new wearer of contact lenses. By rendering the surfaces of the lenses wettable by lacrimal fluid, many complaints and problems such as irritation, foreign body sensation, excessive tearing and the like are greatly reduced or eliminated. This procedure also finds use on a continuing basis with those wearers who are extremely sensitive to contact lens use or who suffer from adaptability problems commonly referred to as chronic overawareness. While the procedure of this invention is expected to find most use by the clinician, it is also contemplated for use by the wearer especially among those who suffer from chronic overawareness.

The following example illustrates a specific, though non-limiting embodiment of the invention.

EXAMPLE

Aluminum chloride is added to distilled water to form a dilute aqueous solution. Sufficient sodium hydroxide solution is added to raise the pH of the solution to the range of about 5.0 to 5.5. The solution is gently heated at a temperature below the boiling point for several hours to produce a whitish colloidal suspension of hydrous aluminum oxide.

The suspension is cooled and contact lenses made of poly methyl methacrylate are immersed in the suspension for a 5 to 10 minute period. Thereafter, the lenses are removed from the suspension, rinsed with water, and inserted over the cornea of a wearer's eyes. Increased user comfort results from the lens treatment.

What is claimed:

1. A method for increasing the wearing comfort of hard contact lenses which comprises contacting the lens surfaces with an aqueous colloidal suspension of a physiologically inert inorganic hydrous oxide thereby rendering said lens surfaces wettable by lacrimal fluids, rinsing the lenses to remove any non-adhering colloidal particles and inserting the lenses over the cornea of the eye.

2. The method of claim 1 wherein said hard contact lenses are made from poly methyl methacrylate.

3. The method of claim 2 wherein said inorganic hydrous oxide is selected from the group consisting of the hydrous oxides of tin, silicon, aluminum and magnesium.

4. The method of claim 3 wherein the inorganic hydrous oxide is produced by the hydrolysis of a salt in aqueous solution.

5. The method of claim 4 wherein the salt is a chloride.

6. The method of claim 5 wherein sodium hydroxide is used to adjust the pH of the salt solution during hydrolysis.

7. In the process of fitting hard type contact lenses to a new wearer, the improvement which comprises treating the lenses prior to insertion in the eye with an aqueous, colloidal suspension of a physiologically inert hydrous inorganic oxide for a time sufficient to render the lens surfaces readily wettable by lacrimal fluids.

8. The process of claim 7 wherein said hard contact lenses are made from poly methyl methacrylate.

9. The process of claim 8 wherein said inorganic oxide is selected from the group consisting of the hydrous oxides of tin, silicon, aluminum and magnesium.

* * * * *